(12) United States Patent
Rosenbaum

(10) Patent No.: US 6,779,958 B2
(45) Date of Patent: Aug. 24, 2004

(54) ATTACHMENT ELEMENT

(75) Inventor: Ulrich Rosenbaum, Wangs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/353,429

(22) Filed: Jan. 29, 2003

(65) Prior Publication Data

US 2003/0147722 A1 Aug. 7, 2003

(30) Foreign Application Priority Data

Feb. 1, 2002 (DE) .......................................... 102 04 139

(51) Int. Cl.⁷ ........................... F16B 15/08; F16B 37/14
(52) U.S. Cl. ................... 411/442; 411/372.5; 411/377; 206/345
(58) Field of Search ........................ 411/372.5, 372.6, 411/373, 377, 442, 443, 444; 206/345, 346, 347

(56) References Cited

U.S. PATENT DOCUMENTS

| | | | | |
|---|---|---|---|---|
| 4,932,821 A | * | 6/1990 | Steffen et al. | 411/442 |
| 4,948,319 A | * | 8/1990 | Day et al. | 411/377 |
| 5,827,032 A | * | 10/1998 | Howard | 411/377 X |
| 6,158,933 A | * | 12/2000 | Nicholson | 411/377 X |
| 6,302,630 B1 | * | 10/2001 | Grant | 411/377 X |

FOREIGN PATENT DOCUMENTS

FR      2386722    * 11/1978      411/377

* cited by examiner

Primary Examiner—Neill Wilson
(74) Attorney, Agent, or Firm—Sidley Austin Brown & Wood, LLP

(57) ABSTRACT

A fastening element having a stem provided, at its opposite ends, with a head and a tip, respectively, and a separate cover element releasably arrangeable on the head.

8 Claims, 3 Drawing Sheets

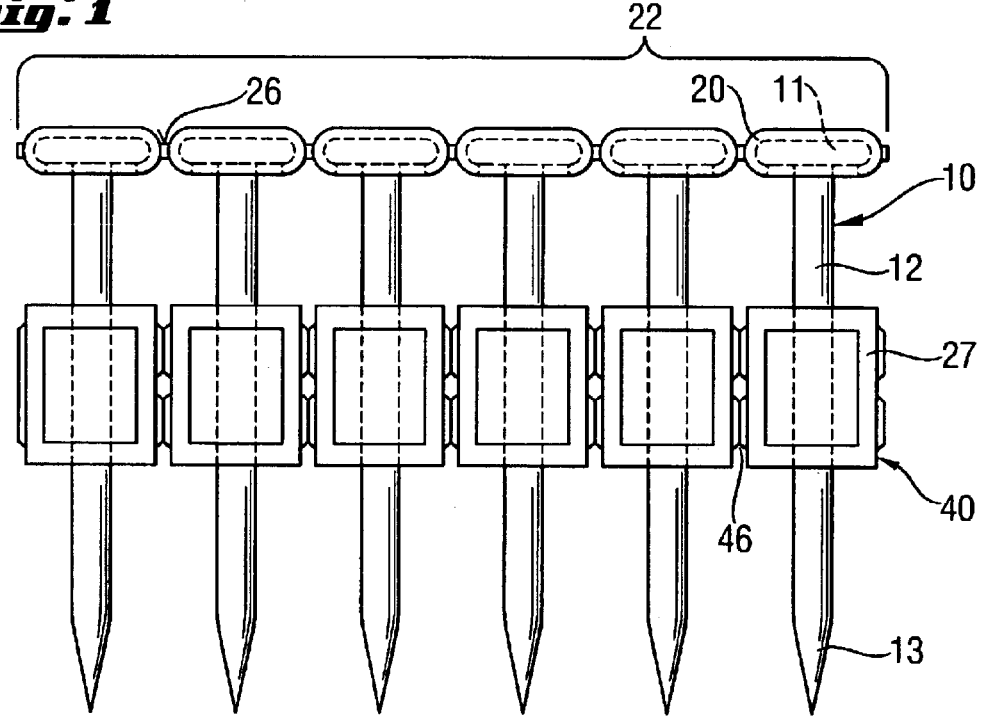
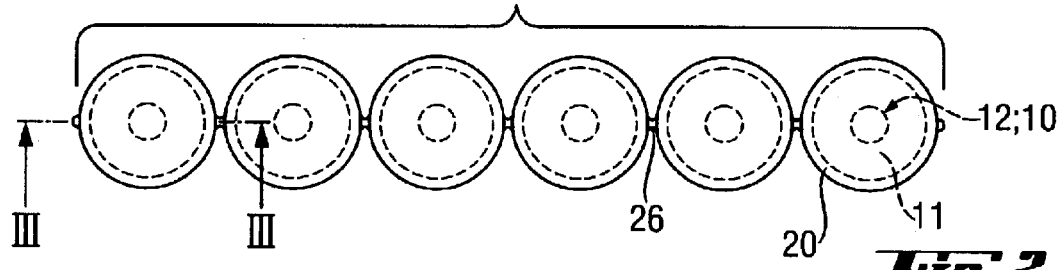
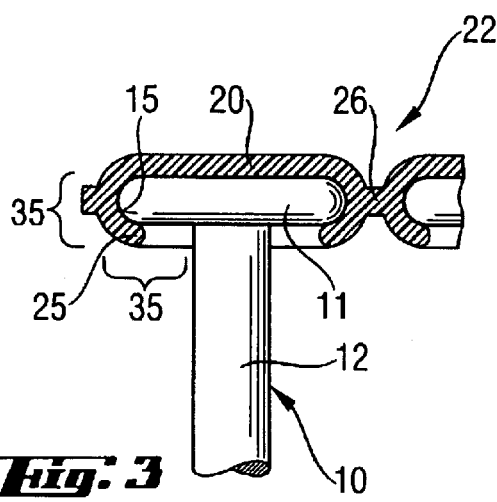
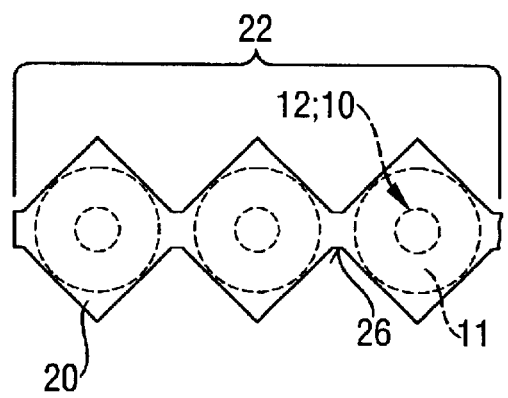

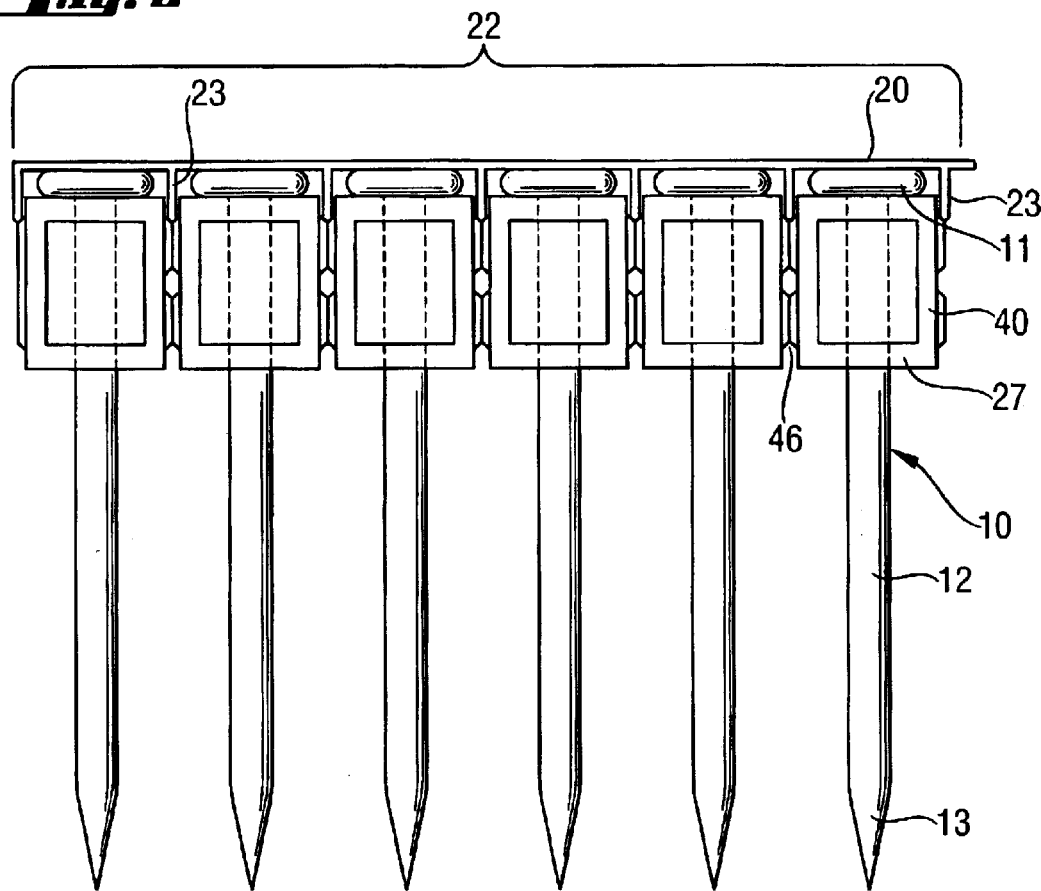
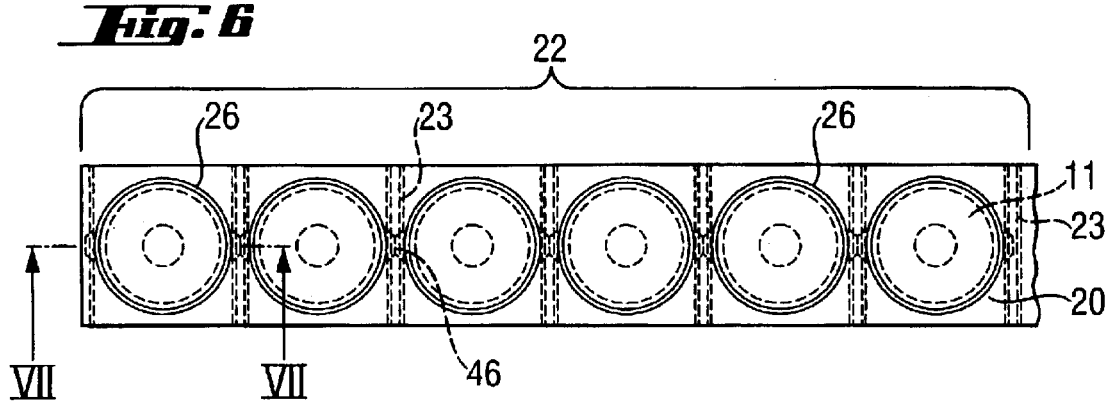

ATTACHMENT ELEMENT

BACKGROUND OF THE INVENTION

1. Field of Invention

The present invention relates to a fastening element for use in setting tools and having a stem provided at its opposite ends with a tip and a head, respectively, with the head being covered by a cover element.

2. Description of the Prior Art

Setting tools for driving fastening elements in a substrate include a drive piston that impacts a fastening element for driving the fastening element in. The problem with the drive piston consists in that metallic impacts of the piston on the to-be-set fastening elements, e.g., bolts or nails lead to a high wear of the piston. In setting tools having a small power, e.g., in combustion-engined setting tools, the wear of the piston tip or end is a primary reason of the piston failure. As a result, because of a rapid wear of the piston, the setting tools should be designed so as to insure an easy replacement of the drive piston. This results in high costs of the setting tools and in high maintenance costs as the drive piston should be replaced often.

U.S. Pat. No. 2,140,749 disclose a manually driven-in nail the head of which is covered with a coating. The coating remains dry at a normal room temperature. However, under higher temperatures, the coating becomes sticky. Such nails are used, e.g., in roof covering when, simultaneously with driving-in of a nail, sealing of the entry opening of the nail against the nail head should take place in order to prevent penetration of moisture. In the known fastening elements, the cover or the coating is removed, after the setting of a fastening element, only with much difficulty. However, in many applications, in which the fastening elements are driven in with a setting tool, it is required that no soft or sticky coating remains on the head of a fastening element. Accordingly, an object of the present invention is to provide a fastening element in which the above-discussed drawbacks of conventional fastening elements are eliminated and which can easily be used in a setting tool.

SUMMARY OF THE INVENTION

This and other objects of the present invention, which will become apparent hereinafter are achieved by providing a separate cover element that is detachably arranged on the head of a fastening element.

A separate cover element, which, during a setting process, absorbs the setting energy by being deformed, noticeably reduces the wear of the drive piston. Likewise, by forming the cover element as a detachable element, it is easily removed from the head after the setting process, without leaving any residue.

Advantageously, the cover element is provided with stud or a clip element for being releasably secured to the head of a fastening element. The provision of the stud or clip element insures that the cover element does not become lost during transportation, while still being easily removable from the head after the setting process.

Advantageously, the fastening elements can be assembled into a magazine by connecting separate cover elements with each other. In this case, additional elements for forming the magazine of fastening elements are not needed.

According to a further advantageous development of the present invention, the cover element is provided with a holding element that permits to releasably secure the cover element to the head of a fastening element. This holding element can be formed as a stud engageable in a groove formed in the fastening element head.

According to another advantageous development of the present invention, the holding element can be formed as a collar provided at the edge of the cover element and with which the cover element can be clipped on the head of a fastening element.

Advantageously, a strip of cover elements with the cover elements is secured not to the fastening elements but rather is provided with braces or/and webs with which the cover element strip is mounted on another magazine strip that encompasses the stems of the fastening elements. During the setting process, the webs are automatically teared off, whereby the separation of the cover element from the second magazine strip takes place automatically.

Advantageously, cover elements are formed of a plastic material, which substantially reduces the wear of the setting direction end of the drive piston. Instead of the plastic material, other deformable materials, e.g., light metals, can be used.

According to the present invention, between the cover elements of a cover element strip, there are provided weakness arears or break-off points, which insure an easy separation of the cover elements from the cover element strip during a setting process.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a side view of a section of a magazine with fastening elements according to the present invention;

FIG. 2 a top view of the magazine section shown in FIG. 1;

FIG. 3 a cross-sectional view along III—III in FIG. 2;

FIG. 4 a top view on several fastening elements according to a second embodiment;

FIG. 5 a side view of a section of a magazine with fastening elements according to a third embodiment of the present invention;

FIG. 6 a top view of the magazine section shown in FIG. 5;

DETAILED DESCRIPTION OF THE PREFERRED EMBODIMENTS

Figure 7:
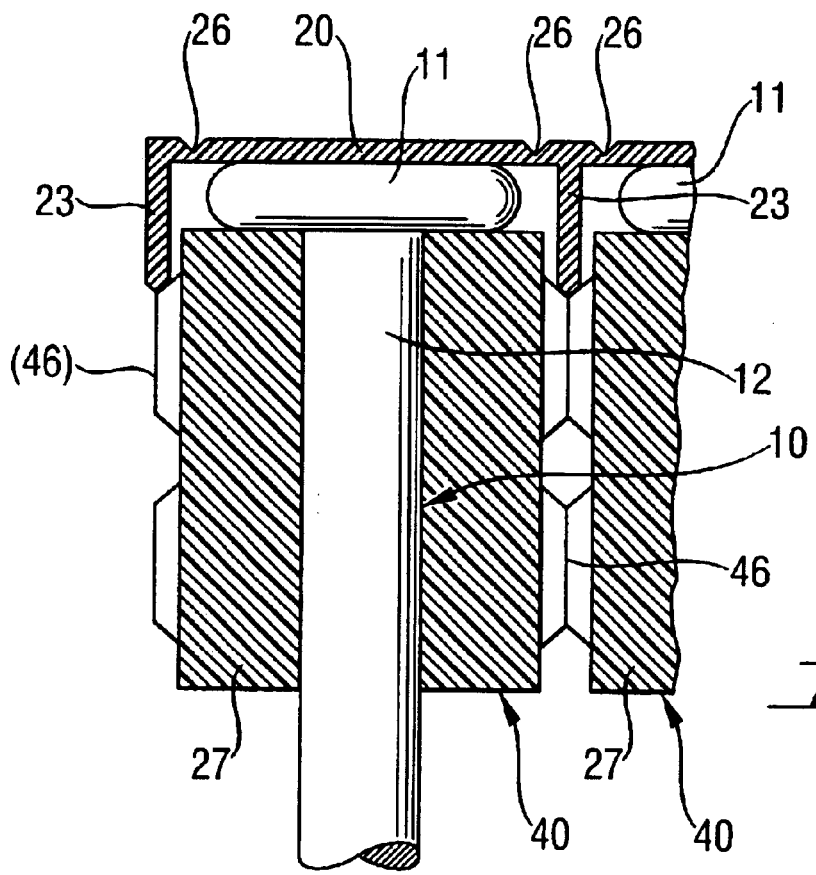
FIG. 7 a cross-sectional view along line VII—VII in FIG. 6 at an increased scale.

A first embodiment of a fastening element 10 according to the present invention is shown in FIGS. 1–3. The fastening element 10 has a stem 12 at one end of which, there is provide a tip 13 and at another opposite end of which, there is provided a head 11. The head 11 of the fastening element 10 is provided with a cover element 20 that is secured to the head 11 by clip sections 35. The cover element 20 is formed e.g., of a plastic material. A plurality of cover elements 20 are connect with each other by material webs, whereby a magazine strip 22 of fastening elements 10 is formed. The material webs form weakness areas 26 which define break-off points. In the embodiment shown in FIGS. 1–3, the stems 12 of the fastening elements 10 extend through separate segments 27 of a magazine strip 40. The separate segments 27 are connected with each other by webs 46 having each a break-off point.

When a fastening element 10 is brought into a bolt guide of a setting tool and is advanced through the bolt guide by a setting direction end of a drive piston, a respective web 46 is teared off at its break-off point, and a respective cover element 20 is teared Doff from the strip 22 at the break-off point of the respective weakness area 26, which insures displacement of the fastening element 10 through the bolt guide (not shown).

The clip section 35 of the cover element 20, which is provided on the head 10, is formed, in the embodiment shown in FIGS. 1–3, by a holding element 25 provided at an edge of the cover element 20. The holding element 25 is formed as a concave collar. After setting of a fastening element 10, the clip section 35 can be easily released, providing for removal of the cover element 20 from the fastening element 10. It should be pointed out that the magazine strip 40 is not absolutely necessary as arranging the fastening elements in the magazine strip 22 suffices. However, in spite of this, it makes sense to provide separate elements on the stems which serve for guiding the fastening elements in the bolt guide of the setting tool.

The embodiment of the fastening element 10, which is shown in FIG. 4, differs from that shown in FIGS. 1–3 in that the cover element 20 has a square shape.

In the embodiment of fastening elements 10 shown in FIGS. 5–7, the fastening elements 10 are hoisted on the magazine strip 40 which is formed, as in the embodiment of fastening element 10 shown in FIGS. 1–3, of separate segments 27 connected with each other by webs 46. The separate segments 27 serve, as it has been discussed above, for guiding the fastening elements 10 in the bolt guide of a setting tool. However, in the embodiment of fastening elements 10 shown in FIGS. 5–7, contrary to that of FIGS. 1–3, the magazine strip 40 extends immediately beneath the heads 11 of the fastening elements 10. Above the heads 11, there is provided, as in the embodiment of FIGS. 1–3, a strip 22 of separate cover elements 20 which cover the heads 11 of respective fastening elements 10. The strip 22 is connected with the located below, magazine strip 40 by web-shaped elements 23 which extends into the space between adjacent separate segments 27. The strip 22 and the web-shaped elements 23 can be glued to the magazine strip or be welded thereto.

The strip 22 is provided with weakness areas 26 that circumscribe the cover elements 20. When the fastening element 10 of the embodiment shown in FIGS. 5–7, is brought or advanced into the bolt guide of a setting tool and is advanced in the setting direction by the drive piston (not shown), the cover element 20 is teared off of the strip 22 at the weakness area 26, and the separate segment 27 of the strip 40 is teared off at a web 23. Because the cover element 20 is not connected directly with the head 11 of the fastening element, the cover element 20 falls off the head 11 immediately after the setting process, or the cover element 20 can be easily removed, without extending much force, from the head 11 of a set fastening element 10.

Figure 8:
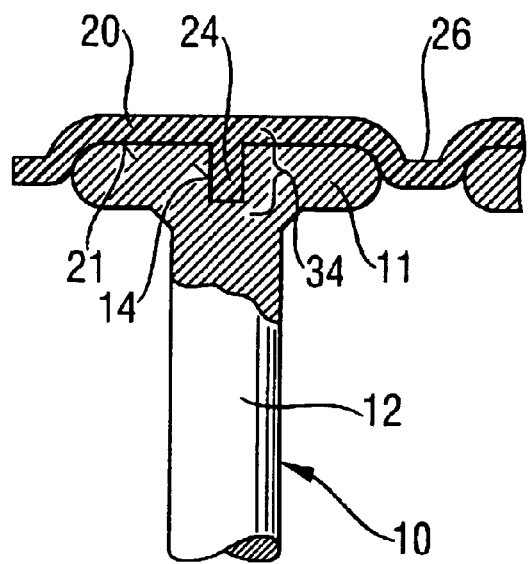
FIG. 8 a cross-sectional view of a section of a magazine with a fastening element according to a fourth embodiment of the present invention.

In the embodiment of a fastening element 10 shown in FIG. 8, the cover element 20 is secured to the head 11 with a web-shaped element 24 with a, possibility of easy removal therefrom. The head 11 is provided, to this end, with a groove 14 into which a web-shaped holding element 24 can engage. The web-shaped holding element 24 extends from the bottom 21 of the cover element 20. As in the previous embodiments the adjacent cover elements 20 are connected with each other by weakness areas 26, forming the strip 22.

It should be pointed out that the shape of a cover element should be adapted to the geometry of a head of a fastening element.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A fastening element, comprising (12); a head (11) provided at one end of the stem (12); a tip (13) provided at another, opposite end of the stem (12); and a separate cover element (20) detachably arranged on the head (11) of the fastening element.

wherein a plurality of cover elements (20) of a respective plurality of fastening elements are connected with each other, forming a one-piece strip (22), with at least one region of each cover element (20) being capable of being separated from the strip (22).

2. A fastening element according to claim 1, wherein the strip (22) forms a magazine of fastening element (10).

3. A fastening element according to claim 1, wherein the cover element (20) has on a side thereof (21) adjacent to the head (11) a holding element (24, 25) for releasably securing the cover element (20) to the head (11).

4. A fastening element according to claim 1, wherein the stem (12) of the fastening element extends through a further strip (40), and the one-piece strip (22) has or at least one of the brace-shaped elements and web-shaped elements (23) for being releasably mounted on the further strip (40).

5. A fastening element according to claim 1, wherein the cover element (20) is formed of a plastic material.

6. A fastening element according to claim 1, the cover elements (20) are connected with each other by webs having each a weakness area (26).

7. A fastening element, comprising a stem (12); a head (11) provided at one end of the step (12); a tip (13) provided at another, opposite end of the stem (12); and a separate cover element (20) detachably arranged on the head (12) of the fastening element.

wherein the cover element (20) has, on a side thereof (21) adjacent to the head (11), a holding element (24, 25) for releasably securing the cover element (20) to the head (11); and wherein the holding element (24) has a web that cooperates with a groove (14) provided in the head.

8. A fastening element according to claim 7, wherein the holding element (25) comprises at least one collar provided at an edge of the cover element (20) for clipping the cover element (20) to the head (11).

* * * * *